No. 715,705. Patented Dec. 9, 1902.
F. W. & W. A. E. STUTT.
ERASER CLEANER.
(Application filed Aug. 7, 1902.)
(No Model.) 2 Sheets—Sheet 1.

WITNESSES: INVENTORS.
F. W. Stutt.
Wm. A. E. Stutt.
BY
ATTORNEY.

THE NORRIS PETERS CO., PHOTO-LITHO., WASHINGTON, D. C.

No. 715,705. Patented Dec. 9, 1902.
F. W. & W. A. E. STUTT.
ERASER CLEANER.
Application filed Aug. 7, 1902.
(No Model.) 2 Sheets—Sheet 2.

WITNESSES: INVENTORS.
Otto E. Haddick F. W. Stutt
Dena Nelson Wm. A. E. Stutt
By ATTORNEY.

THE NORRIS PETERS CO., PHOTO-LITHO., WASHINGTON, D. C.

UNITED STATES PATENT OFFICE.

FREDERICK W. STUTT AND WILLIAM A. E. STUTT, OF DENVER, COLORADO.

ERASER-CLEANER.

SPECIFICATION forming part of Letters Patent No. 715,705, dated December 9, 1902.

Application filed August 7, 1902. Serial No. 118,821. (No model.)

*To all whom it may concern:*

Be it known that we, FREDERICK W. STUTT and WILLIAM A. E. STUTT, citizens of the United States of America, residing at Denver, in the county of Arapahoe and State of Colorado, have invented certain new and useful Improvements in Eraser-Cleaners; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in eraser-cleaners, and is especially adapted for use in schools for removing the powdered chalk from the erasing fabric after the latter has become laden therewith by repeated use.

Our object is to provide an apparatus of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

Figures 1, 2:
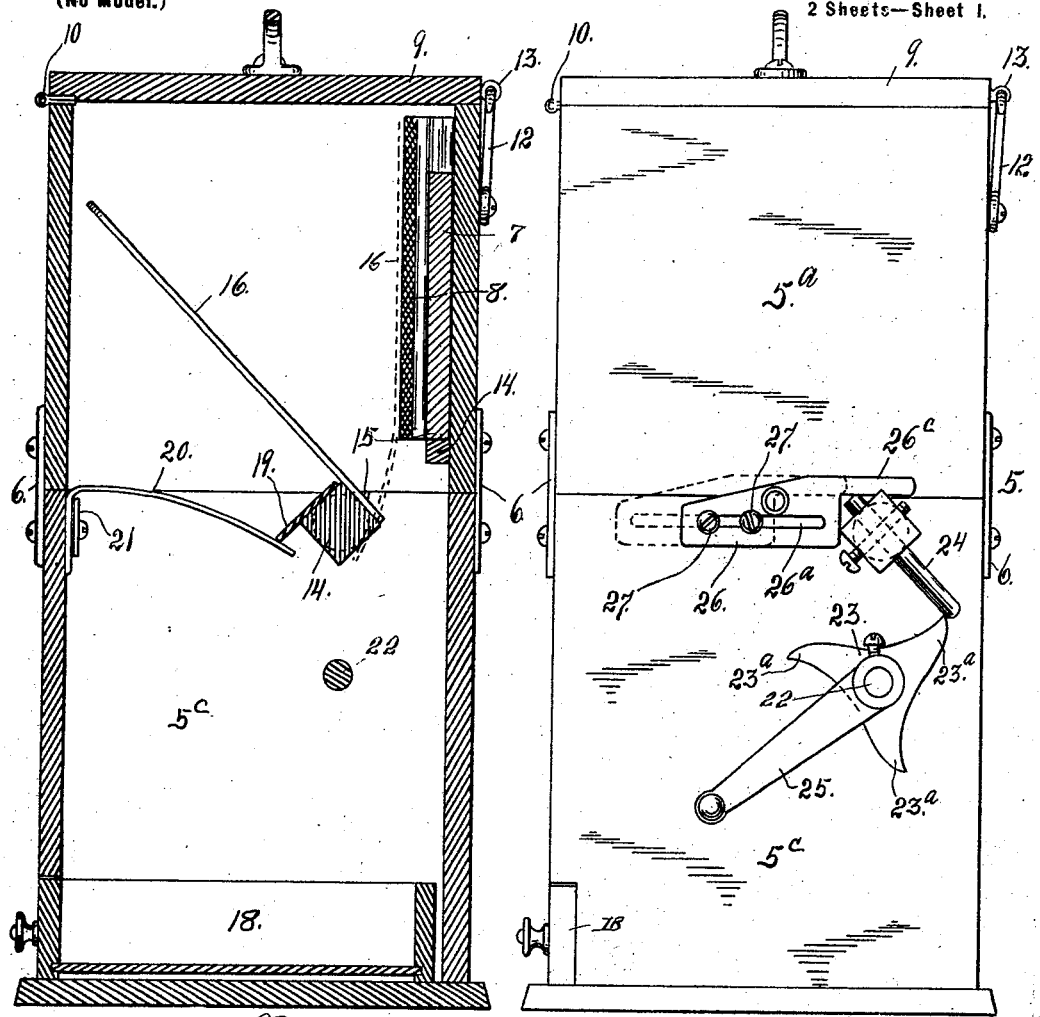
Figure 3:
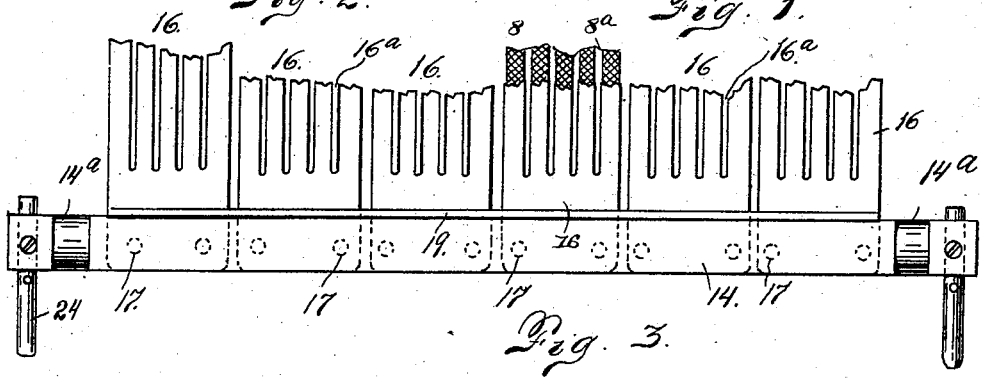
Figure 4:
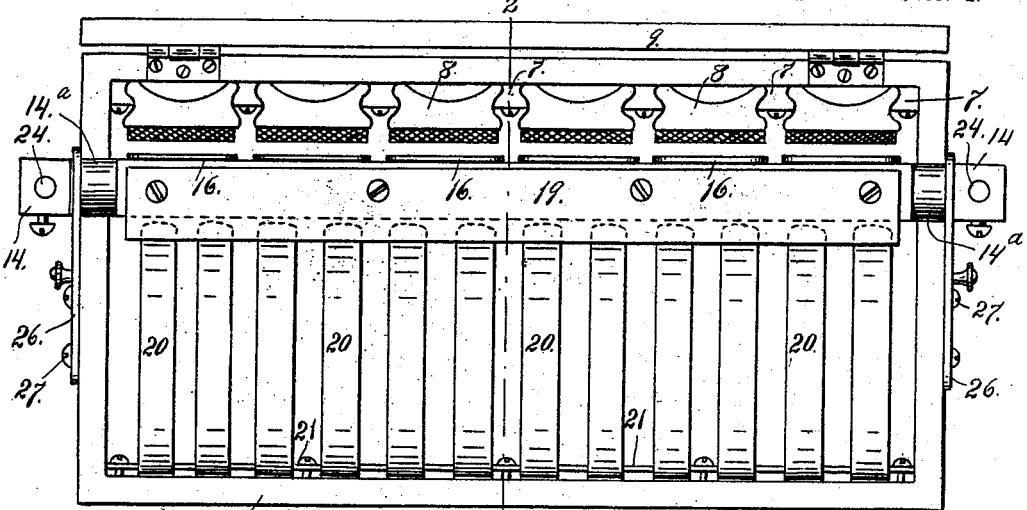
Figure 5:
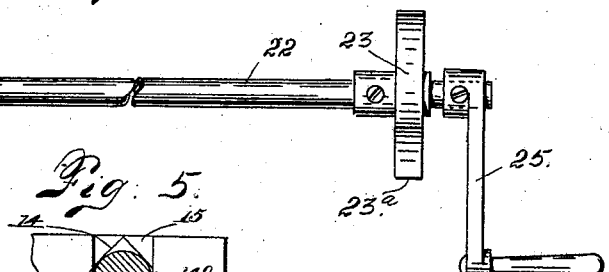
Figures 6, 7, 8:
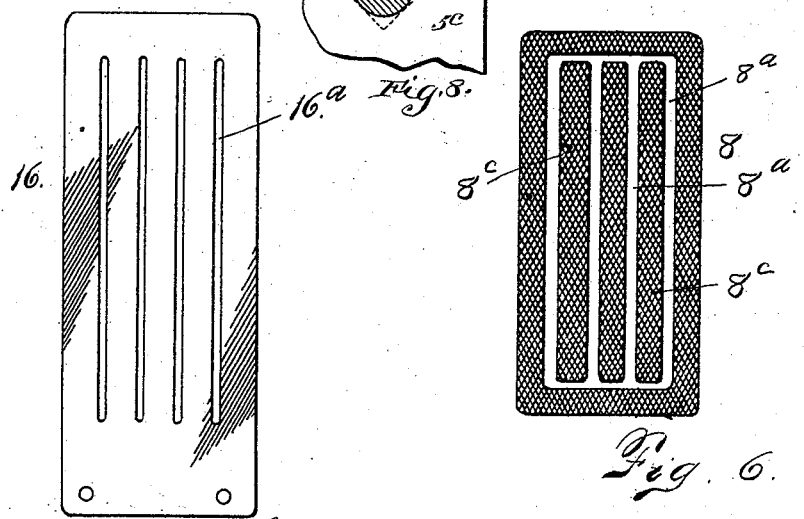

In the drawings, Figure 1 is a side elevation of our improved eraser-cleaning apparatus. Fig. 2 is a section taken through the casing inclosing the operating mechanism on line 2 2, Fig. 4. Fig. 3 is a detail view of the rock-shaft carrying the eraser-beaters, the latter being partly broken away. In this view a fragment of an eraser 8 is shown, the same being located behind a beater. Fig. 4 is a top or plan view of the apparatus with the top lid or cover of the casing removed. Fig. 5 is a detail view of the operating cam-shaft. Fig. 6 is a detail face view showing one of the erasers for cleaning which our improved apparatus is employed. Fig. 7 is a detail view of one of the beaters shown on a larger scale. Fig. 8 is a fragmentary view of the casing, showing the open bearing 15 and the rock-shaft therein in section.

The same reference characters indicate the same parts in all the views.

Let the numeral 5 designate a casing which, as shown in the drawings, is composed of two members $5^a$ and $5^c$. The casing parts or members are connected in any suitable manner, whereby they may be readily detached if desired. As shown in the drawings, two arms or cleats 6 are employed. These arms occupy a vertical position and are fastened by screws to the respective parts. When it is desired to remove the top member of the casing, the fastening-screws which connect the cleats 6 therewith are removed and the member is lifted off. In the upper part $5^a$ of the casing is formed a sort of rack composed of strips 7, suitably separated to receive erasers 8. The strips are provided with ribs or tongues adapted to engage the grooves formed in the edges of the erasers. The lid or cover 9 of the casing is hinged at 10 and held closed by a hook 12, pivoted on the part $5^a$ and engaging an eye 13, attached to the lid. When this lid is raised, the erasers may be placed in the rack and removed at pleasure, since the spaces for their reception are open at the top. Below the strips 7 a piece $14^c$ is located, which forms a stop to prevent the erasers from passing too far downwardly. When placed in the holding-rack, the erasing-faces of the blocks are exposed in the upper part of the casing. As shown in the drawings, (see Fig. 7,) these faces are provided with longitudinal grooves $8^a$, separating the strips $8^c$ of the erasing material.

Journaled within the upper part of the casing member $5^c$ is a rock-shaft 14, whose journals $14^a$ engage bearings 15, which, as shown in the drawings, are open at the top to permit the removal of the shaft. These bearings are closed by the casing part $5^a$ when the latter is in position. The body portion of this rock-shaft, as shown in the drawings, is square in cross-section. To one of the flat sides of this shaft are secured a number of beaters 16. The lower extremity of each beater is attached to the shaft by means of screws 17 or other suitable fastening devices, whereby the beaters may be detached at pleasure. These beaters are preferably formed of spring metal, and they are provided with slots $16^a$, which register with the grooves $8^a$ of the erasers when the beaters are in contact with the latter. These slots permit the escape of the dust or fine chalk as it is removed from the erasing-face. This dust passes through the slots of the beaters and falls downwardly into a drawer 18 in the bottom of the casing. This drawer may be removed and emptied at suitable intervals. To another side of the rock-shaft is attached a narrow plate 19, which may be called the "engaging" plate. This plate projects from the rock-shaft to engagement with a series of leaf-springs 20, whose extremities remote from the rock-shaft are bent downwardly and slipped behind a keeper-plate 21, applied to the upper part of the casing member 5ᶜ. Hence the springs are removable at will.

Below the rock-shaft 14 is located an operating cam-shaft 22, which is journaled in the casing member 5ᶜ and provided with a three-arm cam 23 at each end of the shaft and located outside the casing member. As the shaft 22 is rotated these cams engage adjustable tappets 24, mounted outside of the casing on the rock-shaft extremities. The cam-shaft is provided with a crank 25 for operating purposes.

On the upper part of each end of the casing member 5ᶜ is slidably mounted a keeper 26, provided with a slot 26ᵃ, through which screws 27 are passed into the casing member. Each keeper is provided with a projection 26ᶜ, which closes the bearing 15 at the top and retains the beater rock-shaft in place when the upper casing member is removed. The shaft-retaining position of this keeper is shown by full lines in Fig. 1 and the opposite position by dotted lines in the same figure.

When the apparatus is in use, the casing is tightly closed, so that no dust can escape therefrom. From the foregoing description the operation of the apparatus will be readily understood. Assuming that the erasers 8 are in place within the rack of the upper casing member, the cam-shaft is rotated by turning the crank 25. As the arms 23ᵃ of the cams 23 engage the tappets 24 in succession the beaters 16 are first thrown away from the erasers to the position shown in Fig. 1, whereby the springs 20 are placed under tension, and then as the cam-arms release the tappets the recoil of the springs forces the beaters 16 forcibly against the faces of the erasers, whereby the dust is caused to pass through the slots 16ᵃ of the beaters and allowed to fall downwardly to the catch-drawer 18, as heretofore explained. This operation is repeated until the erasers are thoroughly cleansed of their powdered contents.

Having thus described our invention, what we claim is—

1. In an eraser-cleaner, the combination with a casing, of means for holding the erasers therein to expose their erasing-surfaces, a rock-shaft journaled in the casing, provided with beaters and having an engaging plate, a spring in operative engagement with said plate and normally having a tendency to throw the beaters against the erasers when the beaters are drawn away from the erasers, and means for actuating the rock-shaft whereby it is given a partial turn and released at intervals, substantially as described.

2. The combination with a casing, of means located therein for holding erasers, a rock-shaft journaled in the casing, beater-arms mounted on the rock-shaft, an engaging plate also attached to the rock-shaft, a series of leaf-springs mounted on the casing and in contact with the engaging plate of the rock-shaft, and means for operating the rock-shaft, substantially as described.

3. The combination with a casing, of means located therein for holding erasers, a rock-shaft journaled in the casing, beater-arms mounted on the rock-shaft, an engaging plate also attached to the rock-shaft, a series of leaf-springs in contact with the engaging plate of the rock-shaft, exposed tappets attached to the rock-shaft extremities, and a rotating shaft journaled in the casing and provided with cams engaging the tappets of the rock-shaft for the purpose set forth.

4. The combination of a casing provided with an eraser-holding rack, a spring-held rock-shaft mounted in open bearings fastened in the casing, exposed keepers slidable on the casing to close the rock-shaft bearings, a tappet on the rock-shaft, beaters mounted on the rock-shaft, and means for operating the latter whereby they are alternately drawn away from the erasers and driven forcibly against the same, substantially as described.

5. In an eraser-cleaner, the combination with a casing provided with an eraser-holding rack, a rock-shaft journaled in the casing, a series of independent beaters mounted on the rock-shaft, an engaging plate also mounted on the rock-shaft, a series of leaf-springs mounted on the casing in operative engagement with the said plate, a tappet on the rock-shaft, an operating-shaft also journaled in the casing and provided with a cam engaging the rock-shaft tappet, substantially as described.

6. The combination with a closed casing, of a catch-drawer located in its lower portion, an eraser-holding rack located in its upper portion, a rock-shaft journaled in the casing, beater-arms mounted on the rock-shaft, an engaging plate also attached to the rock-shaft, a series of leaf-springs in contact with the engaging plate of said shaft, and means for operating the latter, substantially as described.

In testimony whereof we affix our signatures in presence of two witnesses.

FREDERICK W. STUTT.
WILLIAM A. E. STUTT.

Witnesses:
DENA NELSON,
EBERT O'BRIEN.